US005164873A

United States Patent [19]

Krantz et al.

[11] Patent Number: 5,164,873

[45] Date of Patent: Nov. 17, 1992

[54] REVERSE CURRENT BIASED DIODE CONNECTOR

[75] Inventors: Leonard A. Krantz, Sidney; Gary C. Toombs, Oneonta; Douglas M. Johnescu, Gilbertsville, all of N.Y.

[73] Assignee: Amphenol Corporation, Wallingford, Conn.

[21] Appl. No.: 706,847

[22] Filed: May 29, 1991

[51] Int. Cl.[5] ........................ H02H 9/00; H01R 13/66

[52] U.S. Cl. ........................................ 361/56; 361/111; 439/620; 333/182

[58] Field of Search ...................... 361/56, 54, 57, 111; 439/620, 40, 45; 333/182, 183

[56] References Cited

U.S. PATENT DOCUMENTS

| | | | |
|---|---|---|---|
| 3,790,858 | 2/1974 | Brancaleone et al. | 339/14 |
| 4,199,736 | 4/1980 | McTaggart et al. | 333/17 |
| 4,236,188 | 11/1980 | Prochazka | 361/111 |
| 4,431,251 | 2/1984 | Krantz | 339/143 |
| 4,572,600 | 2/1986 | Nieman | 339/14 |
| 4,582,385 | 4/1986 | Couper et al. | 339/147 |
| 4,600,262 | 7/1986 | Nieman et al. | 339/147 |
| 4,707,048 | 11/1987 | Gliha et al. | 439/620 |
| 4,729,752 | 3/1988 | Dawson, Jr. et al. | 439/620 |
| 4,746,310 | 5/1988 | Morse et al. | 439/620 |
| 4,747,789 | 5/1988 | Gliha | 439/620 |
| 4,768,977 | 9/1988 | Gliha et al. | 439/620 |
| 5,018,989 | 5/1991 | Black et al. | 439/620 |

*Primary Examiner*—Steven L. Stephan
*Assistant Examiner*—Matthew Nguyen
*Attorney, Agent, or Firm*—Bacon & Thomas

[57] ABSTRACT

A transient suppression connector includes a plurality of contacts each of which carries both a negatively and a positively biased diode. The connector also includes negative and positive bias voltage input pins and a grounding arrangement including a respective common diode for the negatively and the positively biased contact diodes.

48 Claims, 5 Drawing Sheets

REVERSE CURRENT BIASED DIODE CONNECTOR

BACKGROUND OF THE INVENTION

1. Field of the Invention

This invention relates to transient suppression circuits, and in particular to an arrangement incorporating a transient suppression circuit within an electrical connector.

2. Description of Related Art

Transient suppression circuits are required in a variety of applications for the purpose of protecting electric circuit elements from transient voltage pulses induced in connecting cables. Generally, such circuits operate by shunting the transients to ground via a circuit element responsive to the transient voltage or current, and which normally is in an "off" state to permit desired signals to pass along the protected signal line. For this purpose, it is well known to use a semiconductor diode as the shunt device.

It is also known to improve the transient suppression capability of a shunt diode by providing either a positive or a negative diode bias current. Biasing of the diode reduces its internal capacitance and therefore reduces signal distortion. Also, biasing places the diode in a partially "on" state, reducing the turn-on time for shunting transients to ground.

A possible transient suppression diode biasing circuit is shown in FIG. 1. A bias voltage for the diodes is input through terminals 1 and 2. Desired signals are input through terminals 3–22 and output through terminals 93–112. The input lines connecting terminals 3–22 and 93–112 are respectively connected to ground via negatively biased diodes 33–52 and positively biased diodes 63–82. A ground path is completed by common negatively biased diode 25 and common positively biased diode 85.

For many applications, it would be desirable to place such a transient suppression circuit directly within a cable connector. However, even though recent improvements have made it possible to place unbiased transient suppression circuits in a connector, as shown for example in U.S. Pat. No. 4,747,789, it has heretofore been impossible to place a biased transient suppression circuit in a connector.

In known transient suppression connectors, a single diode is placed directly on the connector contact, with one lead electrically connected to the contact and the other to a conductive sleeve engaged by resilient tines extending into apertures within a ground plate. The ground plate is electrically connected to the shell of the connector to complete the ground path from the contact. Examples of such connectors are shown in U.S. Pat. Nos. 4,747,789 and 4,572,600.

Due to spatial constraints, however, this type of connector has only been applied to circuits requiring a single non-biased shunt diode for each contact. Application of a biased transient suppression circuit to a transient suppression connector has not heretofore been proposed.

SUMMARY OF THE INVENTION

It is an objective of the invention to provide a connector which includes a circuit having both positively and negatively biased circuit elements.

It is further objective of the invention to provide a transient suppression connector which includes a transient suppression circuit and a plurality of feedthrough contacts, each carrying a positively and a negatively biased shunt diode.

It is a still further objective of the invention to provide a transient suppression connector including two common bias plates; a positive input terminal for supplying a positive bias current to one of the plates; a negative input terminal for supplying a negative bias current to the other common bias plate, and respective high capacity diodes through which the grounding plates are connected to the shell of the connector.

It is yet another objective of the invention to provide a single transient suppression contact structure on which are mounted both a negatively and a positively biased transient suppression diode, and which can be assembled into a connector, tested, and removed or replaced prior to potting.

More generally, it is also an objective of the invention to provide a connector which includes a biasing circuit for biasing any type of electrical component carried by a contact in the connector.

These objectives are achieved, according to an exemplary preferred embodiment of the invention, by providing a connector contact having two flat component mounting surfaces, preferably in the form of notches. Mounted on one of the two flat surfaces is a negatively biased electrical component and mounted on the other of the two surfaces is a positively biased electrical component. One electrode of each component is connected to the contact, while the other electrode is electrically connected to respective negatively and positively biased common plane structures, preferably via a ground sleeve arrangement which enables the contact to be inserted into apertures in the common biased plane. The bias plane structures are electrically connected to the contacts via flexible tines extending from each aperture to contact the ground sleeves, thereby facilitating removal and insertion of the contacts together with their respective electrical components.

Bias current, according to an exemplary preferred embodiment, is supplied via a removable positive current input pin and a removable negative current input pin. The positive input pin is insulated by an insulating sleeve from the negative common bias plane and connected to the positive common bias plane by a conductive sleeve. Conversely, the negative input pin is insulated by an insulating ground sleeve from the positive common bias plane and connected to the negative common bias plane by a conductive sleeve. The positive and negative common bias plane structures are insulated from the shell may be connected to ground, in one example, through respective 1500 Watt diodes and a circuit board.

DETAILED DESCRIPTION OF THE PREFERRED EMBODIMENTS

Figure 2:
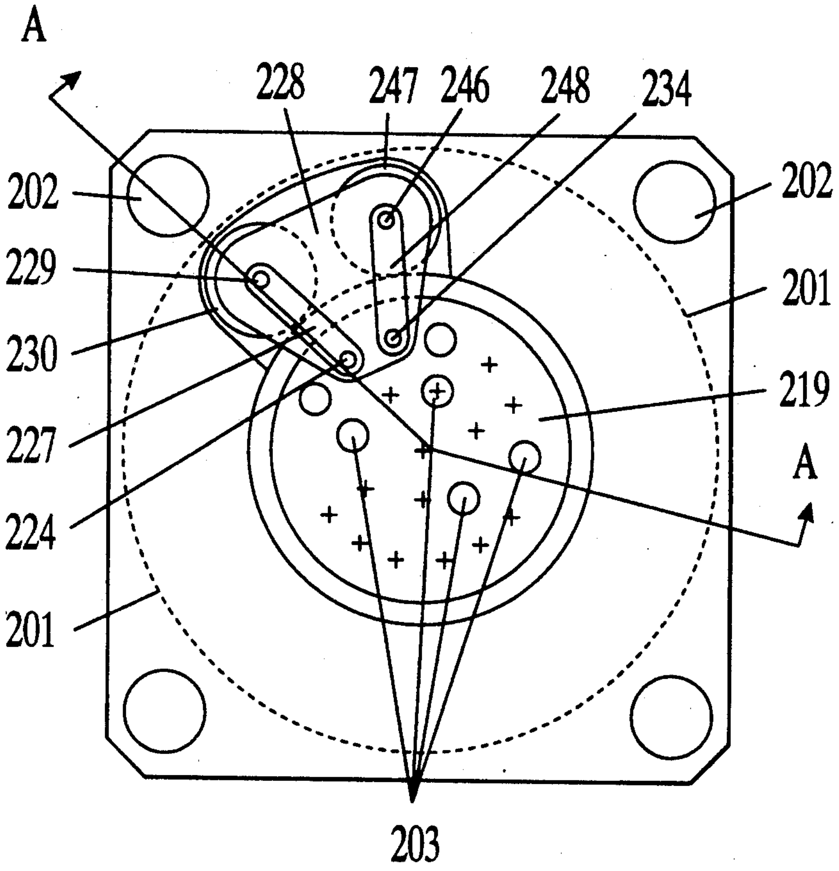
FIG. 2 is an end view of a transient suppression connector according to a preferred embodiment of the invention.
Figure 3A:
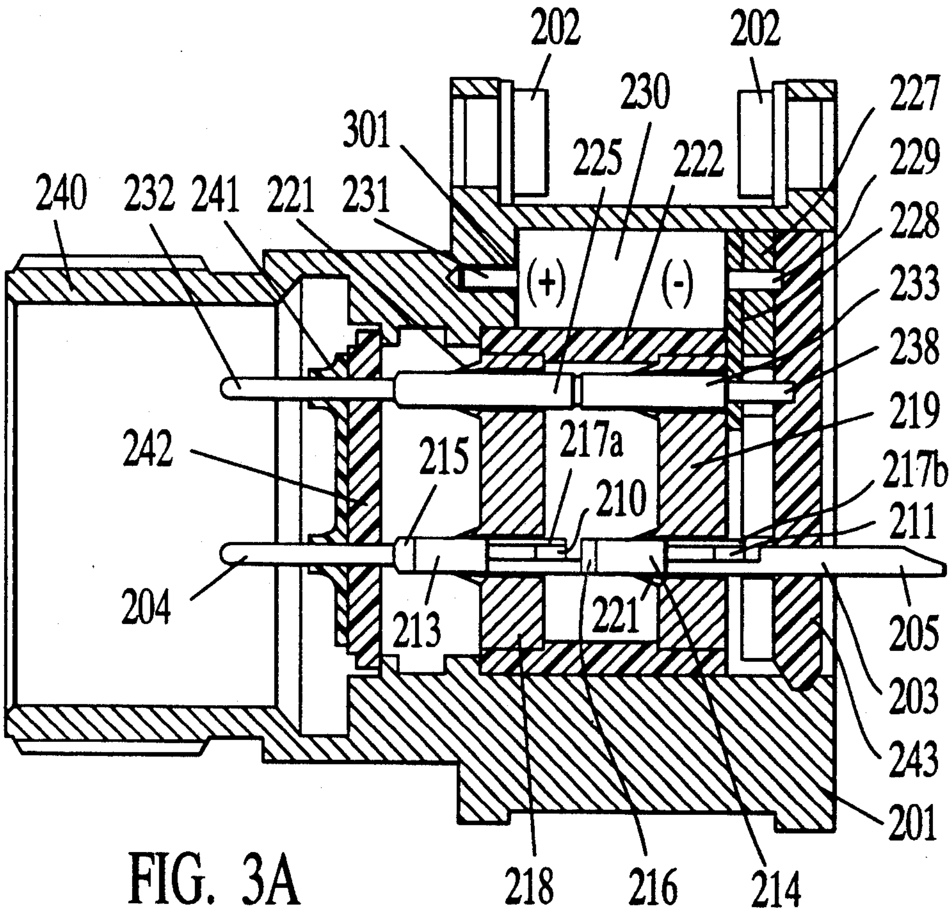
FIG. 3A is a cross sectional side view taken along line A—A of FIG. 2.
Figure 3B:
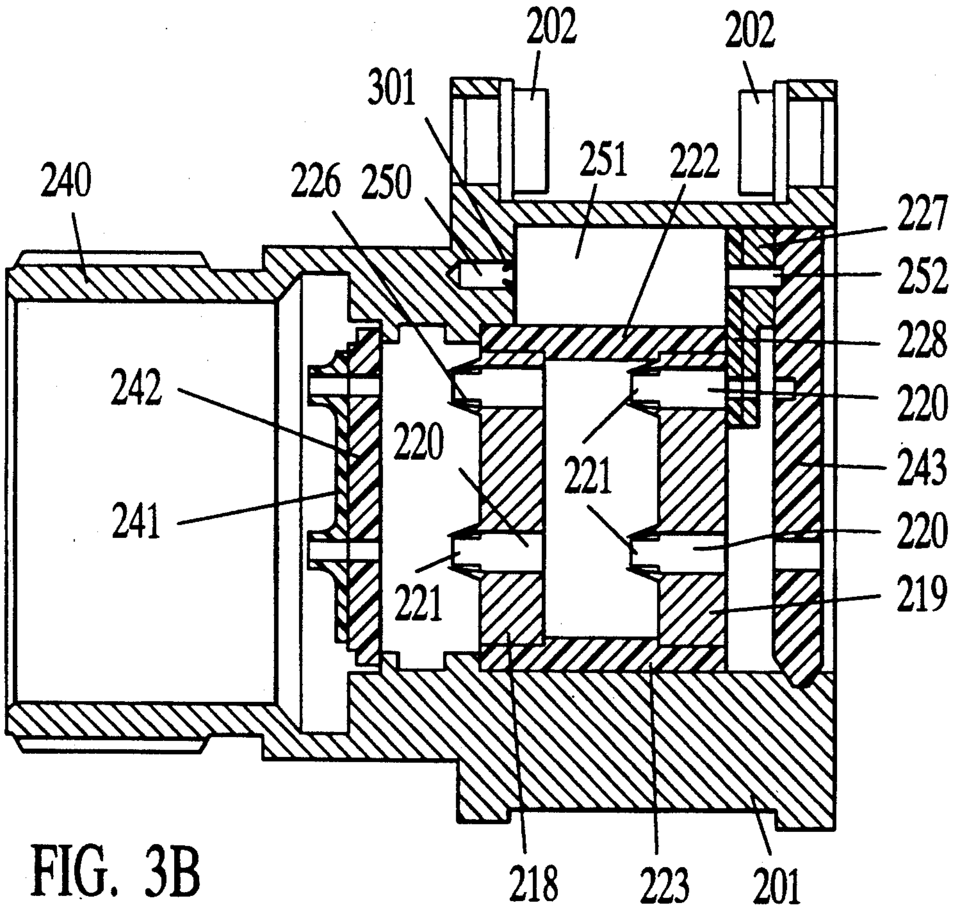
FIG. 3B is a cross sectional view similar to that of FIG. 3A, with contacts removed.

As illustrated in FIGS. 2, 3A and 3B, the preferred connector includes a substantially cylindrical connector shell 201 made of a conductive material and adapted to be connected to ground by any suitable means known to those skilled in the art, for example via connector mounting extensions 202, which give the connector a square appearance as viewed from the end elevation shown in FIG. 2. These extensions are provided to permit the connector shell to be secured to an electrical device or to a FLEXPRINT or PCB board. Suitable securing means include screws or bolts which also provide a continuous ground path from the connector shell 201 to the electrical device.

Figure 5:
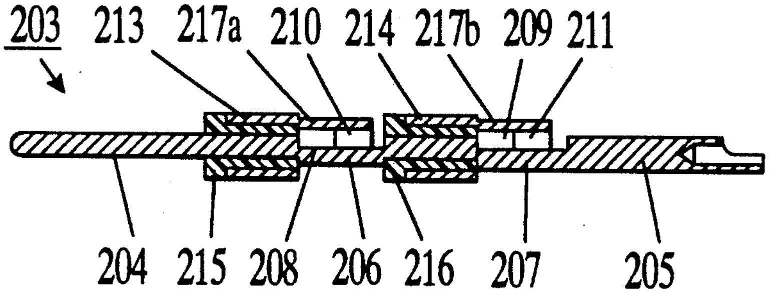
FIG. 5 is a cross sectional side view of a feedthrough contact for use in the connector of FIGS. 2, 3A and 3B.

Connector shell 201 encloses a plurality of feedthrough contacts 203, each including a mating pin section 204 and a solder well section 205, as is most clearly shown in FIG. 5. The configurations of the mating sections 204 and 205 are preferably standard, enabling the connector to be mated with other standard connectors and interfaces having appropriate sockets and/or pins, to individual wires of a cable, or to a printed circuit board. In the latter case, section 205 would take the form of a PCB tail. Of course, it is also within the scope of the invention to include contacts having completely unique mating section configurations for custom applications.

Contacts 203 each includes two transient suppression component mounting sections 206 and 207. In the illustrated embodiment, mounting surfaces 208 and 209 are flat and therefore suitable for mounting chip-type diodes 210 and 211, although a variety of other diode mounting configurations will occur to those skilled in the art. In addition, the invention is intended to apply to contact mountable transient suppression components other than diodes, and to a variety of other electrical components such as filter capacitors or inductors, shunt transistors, impedance matching components, and so forth.

One electrode of each diode 210 and 211 is electrically connected to the contact pin 203, either directly or via lead (not shown), while the other electrode is connected, in the preferred embodiment, to a respective electrically conductive cylindrical ground sleeve 213 or 214. Ground sleeves 213 and 214 are insulated from the contact pins by insulation sleeves 215 and 216.

The ground electrode of diodes 210 and 211 may be electrically connected to ground sleeves 213 and 214, and to contact 203, by a variety of different means, including extensions of the ground sleeve or, as illustrated, suitably formed leads 217*a* and 217*b*. In addition, it is within the scope of the invention to place the ground sleeve over the diode itself, using a suitably formed ground lead, or to provide lateral electrodes rather than the illustrated top and bottom electrodes.

Preferably, mounting surfaces 208 and 209 are located in recesses or notches such that the diodes sit within the notches and do not extend outside the largest diameter of contact pin 203. This facilitates insertion of the contact pin assemblies into the connector and electrical connection to the common bias plane structures, which will be described below. The preferred connector is thus also arranged to permit the contact pins to be easily removed for replacement or servicing during assembly and testing.

The two diodes 210 and 211 are, respectively, negatively and positively biased via a pair of common bias plane structures in the form of plates 218 and 219. These conductive common bias plates are similar to known ground plates in that they are metallized and contain a plurality of apertures 220 through which the contact pins are inserted. However, unlike ground plates, bias plates 218 and 219 are electrically isolated from the shell by selectively metallizing the structures to leave dielectric substrate material exposed at the periphery, therefore providing dielectric insulation.

Each aperture 220 includes resilient tines 221 which engage grounding sleeves 213 and 214 to establish electrical contact between the grounding sleeves and the grounding plates. Consequently, each feedthrough contact pin 203 is electrically connected to common bias plate 218 via diode 210, and to common bias plate 219 via diode 211. Tines 221 serve to support contact 203 within apertures 220, while at the same time permitting each contact to be withdrawn from common bias plates 218 and 219 and removed from the connector without necessitating removal of the common bias plates.

The two common bias plates 218 and 219 are insulated from each other and supported by insert 222, which may be formed as a single annular member. It will be appreciated that both common bias plates 218 and 219 and contact pins 203 may also be sandwiched or supported by additional insulating members, made of any suitable dielectric material, and that the connector may contain a variety of inserts other than those shown in the Figures. As shown in FIGS. 3A and 3B, the contacts are additionally supported by dielectric members 241 and 242, and by gasket 243.

Figure 4A:
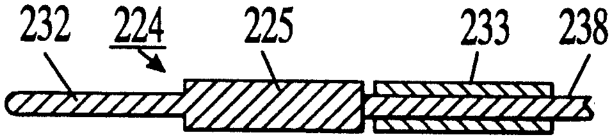
FIG. 4A is a cross sectional side view of a negative input terminal for use in the connector of FIGS. 2, 3A and 3B.

FIG. 4*a* illustrates an input pin 224 through which a negative bias current is input to common bias plate 218, and consequently to diode 210. Negative input pin 224 is insulated from common bias plate 219 by an insulating sleeve 233 and includes an increased outer diameter section or conductive sleeve 225 electrically connecting pin 224 to common bias plate 218 via tines 226, which are identical to tines 221. Section 238 of input pin 224 is electrically connected to a conductive trace 227 on circuit board 228, and trace 227 is electrically connected to lead 229 on a high capacity diode 230. The other lead 231 of diode 230 is electrically connected to connector shell 201 through a spring 301, thereby providing a conductive path from diode 210 to ground via pin section 238 when diode 230 is turned completely "on" by the presence of a transient in the common bias plate. The use of spring 301 to electrically connect lead 231 to shell 201 permits circuit board 228, bias contacts 224 and 234, and high power diodes 230 and 247 to be built as a sub-assembly and then inserted into the shell.

Figure 4B:
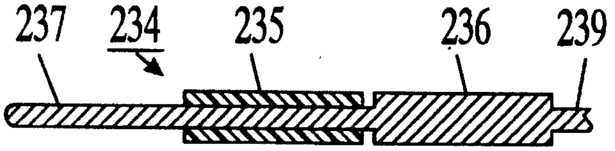
FIG. 4B is a cross sectional side view of a positive input terminal for use in the connector of FIGS. 2, 3A and 3B.

Conversely, as shown in FIG. 4*b*, positive bias current input pin 234 is insulated from negative ground plate 218 by an insulation sleeve 235 and electrically connected to positive ground plate 219 by an increased outer diameter section or conductive sleeve 236. Each of input pins 224 and 234 includes a respective mating pin section 232 and 237 through which power is input, and a respective rear output section 238 or 239, attached to traces 227 and 248 on circuit board 228. Trace 248, best shown in FIG. 2, is electrically connected to lead 246 of a high capacity diode 247, essentially identical to diode 230 but with a reverse polarity. The other lead (not shown) of diode 247 is electrically connected to the shell via a second spring (not shown). Connector shell 201 and circuit board 228 preferably from appropriately shaped recesses 250, 251 and 252 for supporting common diodes 230 and 247, with the ground leads being electrically connected to the shell via the ground springs, or by other suitable electrical connection techniques. It is advantageous to place traces on both sides of circuit board 228 for higher current carrying capacity, and to conformal coat the board for high voltage capability.

The unique features of placing the high power diodes 230 and 247 in a recess milled out of the shell and attaching these diodes to contact 224 and 234 via a printed circuit overcomes the problem of diode size, which was an obstacle to the use of high power diodes in prior connectors. For example, in the described example, the high power diodes shown have a diameter on the order of 0.200 inches as compared with a contact spacing of 0.090 inches.

Another advantage of the input pin arrangement shown in FIGS. 4*a* and 4*b* is that the input pins may be placed in any of ground plate apertures 220 because they present an outer circumference identical to that of contacts 203. Furthermore, if conductive sleeves are used instead of increased outer diameter sections, simply reversing the order of respective sleeves 225 and 233, or sleeves 235 and 236, will convert a positive input pin into a negative input pin and vice versa. Advantageously, therefore, the insulating and conductive sleeves for the input pins are preferably made easily replaceable, for example by using the type of snap-on sleeve mounting arrangement disclosed in commonly owned application Ser. No. 07/698,131, filed May 10, 1991, of Krantz and Johnescu.

Figure 1:
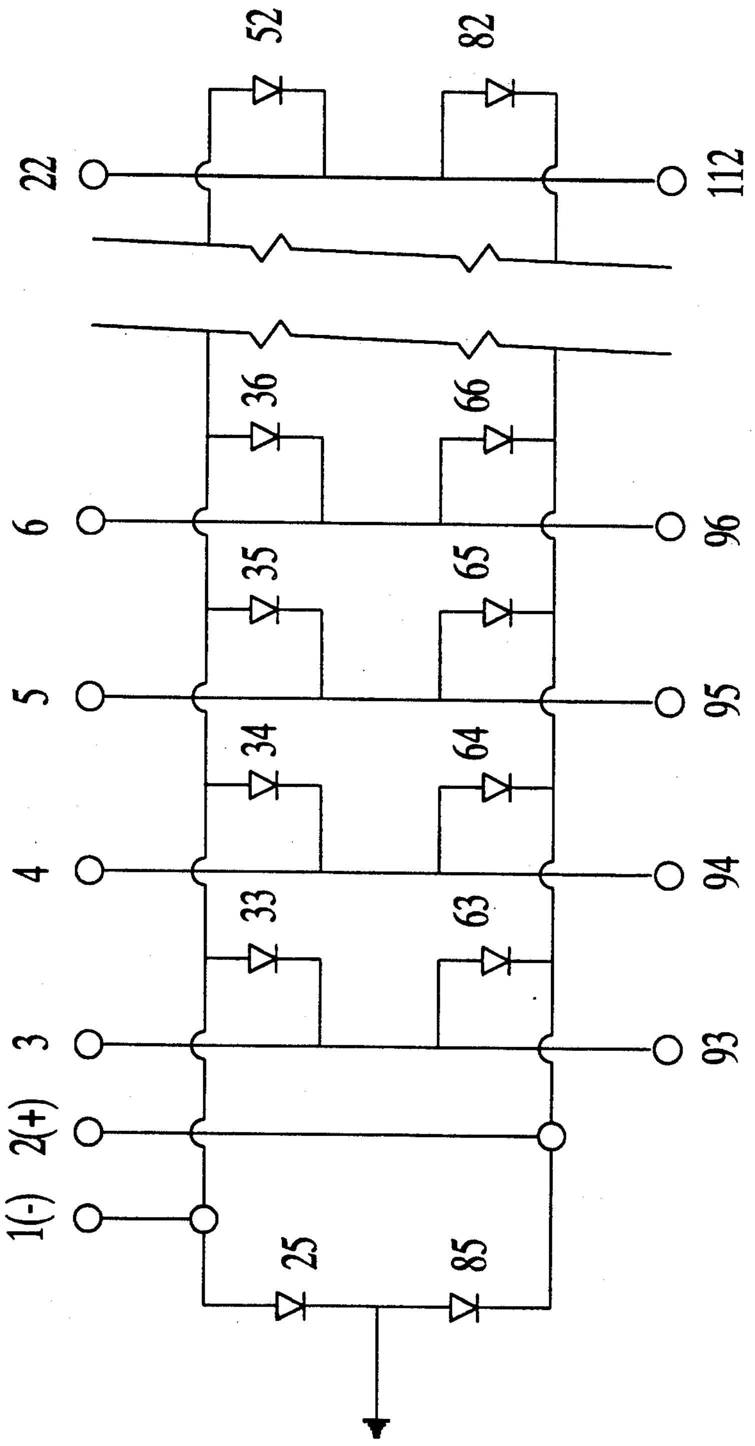
FIG. 1 is a circuit diagram of a transient suppression circuit schematically illustrating the manner in which the circuit elements of a preferred embodiment of the invention are electrically connected together.

Those skilled in the art will recognize that the above elements form a circuit which includes all of the elements of the circuit shown in FIG. 1, yet which fits within a standard multi-pin connector. Furthermore, it will be recognized that the above-described structures may be used for circuits other than the circuit shown in FIG. 1. Such unique elements as a contact having two flat component mounting surfaces, a dual common bias plate arrangement, and interchangeable positive and negative current input pins will find application in a wide variety of contexts.

Although only a single preferred embodiment of the invention has been described, it will clearly be recognized by those skilled in the art that numerous variations are possible within the intended scope of the invention, and that the above description should not be construed as limiting. Rather, it is intended that the scope of the invention be defined solely by the appended claims.

We claim:

1. A connector, comprising:

a feedthrough contact;

transient suppression means including a first electrical component connected between said feedthrough contact and a second electrical component for shunting transient electrical signals to said second electrical component, and thence to ground, when a transient even occurs, said first electrical component being mounted on said feedthrough contact; and means connected between said first electrical component and said second electrical component for supplying a bias current to said first and second electrical components.

2. A connector as claimed in claim 1, wherein said contact comprises means including a flat mounting surface for mounting said first electrical component on said contact.

3. A connector as claimed in claim 2, wherein said first electrical component is a diode.

4. A connector as claimed in claim 3, wherein said contact further comprises a second flat mounting surface, said transient suppression means comprising a third electrical component mounted on said second flat mounting surface.

5. A connector as claimed in claim 4, wherein said third electrical component is a second diode, and said biasing means comprises means for supplying a negative bias current to said first diode and means for supplying a positive bias current to said second diode.

6. A connector as claimed in claim 1, wherein said contact comprises a recess in which said first electrical component is mounted.

7. A connector as claimed in claim 6, wherein said first electrical component is a diode.

8. A connector as claimed in claim 6, wherein said contact further comprises a second recess and said transient suppression means further comprises a third electrical component mounted in said second recess.

9. A connector as claimed in claim 8, wherein said first and third electrical components are diodes.

10. A connector as claimed in claim 9, wherein said biasing means comprises means for supplying a negative bias current to said first diode and means for supplying a positive bias current to said second diode.

11. A connector as claimed in claim 1, wherein said transient suppression means further comprises a first common bias plate; first bias plate connection means for electrically connecting said first bias plate to said second electrical component; means for electrically connecting said second electrical component to a shell of said connector; and second bias plate connection means for electrically connecting said bias plate to a first electrode of said component, and wherein said first bias plate is electrically insulated from said shell.

12. A connector as claimed in claim 11, wherein said common bias plate comprises means defining an aperture through which said contact passes and said second bias plate connection means comprises resilient tines extending inwardly from said aperture to engage a conductive sleeve surrounding said contact, and means for electrically connecting said sleeve to said first electrode of said diode, a second electrode of said diode being electrically connected to said contact.

13. A connector as claimed in claim 12, further comprising a second common bias plate including means defining a second aperture through which said contact passes, means for electrically connecting said second bias plate to a fourth electrical component, and thence to said shell, when a transient event occurs, and means for electrically connecting said second bias plate to a third electrical component mounted on said contact.

14. A connector as claimed in claim 13, wherein said second and fourth electrical components are high capacity diodes.

15. A connector as claimed in claim 14, wherein said high capacity diodes are mounted in a recess milled out of said shell.

16. A connector as claimed in claim 13, further comprising a second feedthrough contact, two electrical components mounted on said second contact, and means for electrically connecting a first of said two electrical components to said first bias plate and a second of said two electrical components to said second bias plate.

17. A connector as claimed in claim 16, wherein said second and fourth electrical components are high capacity diodes.

18. A connector as claimed in claim 17, wherein said high capacity diodes are mounted in a recess milled out of said shell.

19. A connector as claimed in claim 17, wherein said high capacity diodes have a diameter on the order of 0.200 inches, and wherein said connector comprises a plurality of additional feedthrough contacts spaced about 0.090 inches apart.

20. A connector as claimed in claim 19, wherein said high capacity diodes are mounted in a recess milled out of said shell.

21. A connector as claimed in claim 17, wherein each of said electrical components mounted on said first and second contacts are diodes.

22. A connector as claimed in claim 11, further comprising a second feedthrough contact and means for electrically connecting said common bias plate to an electrical component on said second electrical contact.

23. A connector as claimed in claim 11, further comprising a second common bias plate including means for electrically connecting said second common bias plate to a fourth electrical component, and thence to said shell, when a transient event occurs, and means for electrically connecting said second common bias plate to a third electrical component on said contact.

24. A connector as claimed in claim 23, wherein said second electrical component is a reverse biased high capacity diode and said first bias plate connecting means comprises a circuit board, means for electrically connecting a trace on said circuit board to said first bias plate, means for electrically connecting said high capacity diode to said circuit board, and means for electrically connecting said high capacity diode to said shell.

25. A connector as claimed in claim 24, wherein said means for connecting said circuit board to said first bias plate comprises an input pin having one end which comprises means for connecting said input pin to a first bias current source, a second end electrically connected to said trace, and an intermediate section comprising means for electrically connecting said input pin to said first bias plate.

26. A connector as claimed in claim 25, wherein said means for electrically connecting said input pin to said first bias plate comprises a conductive sleeve mounted on said intermediate section.

27. A connector as claimed in claim 26, wherein said intermediate section of said input pin is electrically insulated from said second bias plate by an insulation sleeve mounted on said intermediate section.

28. A connector as claimed in claim 27, wherein said means for electrically connecting said second bias plate to said sheel comprises a second input pin having one end which comprises means for connecting said second input pin to a second bias current source, a second end electrically connected to a second trace on said circuit board, and an intermediate section comprising means for electrically connecting said second input pin to said second bias plate.

29. A connector as claimed in claim 28, wherein said means for electrically connecting said second input pin to said second bias plate comprises a conductive sleeve mounted on said intermediate section.

30. A connector as claimed in claim 28, wherein said intermediate section of said second input pin is electrically insulated from said first bias plate by an insulating sleeve.

31. A connector as claimed in claim 30, wherein said means for supplying a bias current to said first electrical component comprises said first bias current source.

32. A connector as claimed in claim 31, wherein said first bias current source is a negative bias current source.

33. A connector as claimed in claim 32, wherein said means for supplying a bias current to said second electrical component comprises said second bias current source.

34. A connector as claimed in claim 33, wherein said second bias current source is a positive bias current source.

35. A connector as claimed in claim 30, wherein said first electrical component is a diode.

36. A connector as claimed in claim 1, wherein said means for supplying bias current to said first and second electrical components comprises a bias current input pin, means for electrically connecting said input pin to said first electrical component, and means for electrically connecting said input pin to said second electrical component.

37. A connector as claimed in claim 36, wherein said means for electrically connecting said input pin to said first electrical component comprises a bias plate, means for electrically connecting said bias plate to said input pin, and means for electrically connecting said bias plate to said first electrical component.

38. A connector as claimed in claim 37, wherein said means for electrically connecting said bias plate to said input pin comprises a conductive sleeve on said input pin.

39. A connector as claimed in claim 38, wherein said means for electrically connecting said bias plate to said first electrical component comprises means defining a first aperture in said bias plate through which said contact passes and means including resilient tines in said aperture for removably mounting said contact in said first aperture, and wherein said means for electrically connecting said bias plate to said input pin further comprises means defining a second aperture in said bias plate and means including resilient tines for removably mounting said input pin in said second aperture, said first and second apertures being substantially identical to permit exchange of said input pin and contact between said apertures.

40. A connector as claimed in claim 1, wherein said transient suppression means further comprises a third electrical component mounted on said contact.

41. A connector as claimed in claim 40, wherein at least one of said first and third electrical components is a diode.

42. A feedthrough electrical contact, comprising:

a conductive contact body;

means including a first recess in said conductive contact body for mounting a first electrical component on said contact body; and means including a second recess axially spaced from said first recess for mounting a second electrical component on said contact body.

43. A contact as claimed in claim 42, wherein at least one of said first and second electrical components is a diode.

44. A contact as claimed in claim 42, further comprising a first electrically conductive sleeve coaxially mounted on said contact body, means for electrically connecting said first conductive sleeve to said first electrical component, and means for electrically connecting said first electrical component to said contact body.

45. A contact as claimed in claim 44, further comprising a second conductive sleeve coaxially mounted on said contact body, means for electrically connecting said second conductive sleeve to said second electrical component, and means for electrically connecting said second electrical component to said contact body.

46. A current input pin for supplying electrical current to one of two mutually insulated conductive plates in a connector, comprising:

a conductive body including a current input section at one end and an intermediate section on which is mounted a conductive sleeve arranged to contact one of said two conductive plates and an insulating sleeve arranged to contact the other of said two conductive plates when said pin is positioned in said connector.

47. An input pin as claimed in claim 46, wherein said conductive and insulating sleeves have identical outer diameters, whereby a sequence of said sleeves in relation to said input section can be changed without affecting positioning of said input pin in said connector.

48. A bias plate for use in a connector, comprising:

a dielectric substrate;

a metallic coating on said substrate;

means defining a plurality of apertures in said substrate for receiving a plurality of contacts electrically connected to said coating, wherein said dielectric substrate is completely exposed at a periphery of said plate to insulate said plate from conductive shell of a connector.

* * * * *